United States Patent
Kim et al.

[11] Patent Number: 6,127,197
[45] Date of Patent: Oct. 3, 2000

[54] METHOD FOR MEASURING WIDTH OF WIRE IN SEMICONDUCTOR DEVICE USING MEASURING-PATTERN

[75] Inventors: Kil Ho Kim, Kwangju-gun; Kang Sup Shin, Seoul; Jong Il Kim, Chonju, all of Rep. of Korea

[73] Assignee: Hyundai Electronics Industries Co., Ltd., Kyoungki-do, Rep. of Korea

[21] Appl. No.: 09/104,716

[22] Filed: Jun. 25, 1998

[30] Foreign Application Priority Data

Jun. 28, 1997 [KR] Rep. of Korea ........................ 97-28813

[51] Int. Cl.⁷ .................................................. H01L 21/66
[52] U.S. Cl. .............................................. 438/17; 438/800
[58] Field of Search .................................. 438/17, 18, 16, 438/14, 15, 23, 800; 357/23

[56] References Cited

U.S. PATENT DOCUMENTS 4,024,561  5/1977  Ghatalia .
5,049,811  9/1991  Dreyer et al. ........................... 324/158

FOREIGN PATENT DOCUMENTS 0325269  7/1989  European Pat. Off. .
1479869  7/1977  United Kingdom .

*Primary Examiner*—Charles Bowers
*Assistant Examiner*—Craig Thompson
*Attorney, Agent, or Firm*—Selitto & Associates

[57] ABSTRACT

In order to measure a width of a wire a measuring pattern for the width of the wire is prepared. The measuring pattern includes: a first pattern with a first width; a second pattern connected to the first pattern and having a second width wider than the first width; and a third pattern connected to the second pattern and having a third width narrower than the first width. The first pattern, the second pattern and the third pattern are made of same material. The first pattern through a power source is connected to the third pattern. A first pair of probes are disposed on the first pattern and then are connected to a first voltmeter. A distance between the first pair of probes is a first distance wider than the first width. A second pair of probes are disposed on the second pattern and then are connected to a second voltmeter. A distance between the second pair of probes is a second distance wider than the first width. Thereafter the first width using gauged voltage at the first voltmeter and the second voltmeter is determined. The second width is more substantially ten times the first width and the third width is such narrow that current therethrough is uniform.

12 Claims, 1 Drawing Sheet

METHOD FOR MEASURING WIDTH OF WIRE IN SEMICONDUCTOR DEVICE USING MEASURING-PATTERN

BACKGROUND OF THE INVENTION

1. Field of the Invention

The present invention is directed to a wire technique of a semiconductor device, and more particularly to a measuring-pattern for a width of the wire and a method for measuring the width of the wire using the measuring-pattern.

2. Description of the Related Art

A process for a semiconductor should be performed with high accuracy, so after each step of the process, the manufactured should be subject to a test or an evaluation. Since a width of a wire, among many elements for a semiconductor device is one of significant factors affecting performance and stability of the semiconductor device, we must test as to whether or not the width of a manufactured wire is the same as that of a designed wire.

There are many types of measuring method for the width of wire. Among them, one approach is to directly measure the width of wire using SEM(Scanning Electron Microscope) and another approach is to use a resistance of the wire subjected to a measurement and a resistivity of a material constituting the wire wherein the resistance is determined through a four-probe test. The method using the SEM is to scan the pattern to be measured through accelerated electrons, to magnify the pattern using information contained in secondary electrons generated by the accelerated electrons and then to measure the width of the wire. However, when a sectional view of the pattern is not at a right angle, the width of the wire can not be accurately measured by the SEM. The volume of SEM is great, so a space for the SEM in a production line is large. Also, a cost for the SEM is much.

A technique for measuring the width W1 of wire 10 whose thickness is t1 will be described with reference to FIG. 1. On the wire 10 are arranged four probes p1, p2, p3 and p4 each separated by constant interval S1. The outer two probes p1 and p4 are connected to a power source 11 and the inner two probes p2 and p3 are connected to a voltmeter 12. When the current I from the power source 11 flows through the wire 10, a voltage between the probe p2 and the probe p3 is measured at the voltmeter 12. The resistance of the wire is calculated from the measured voltage using Ohm's law and then the width of the wire is computed by entering the calculated resistance to the following equation.

$$W1=(\rho*S1)/(R*t1),$$

wherein ρ is resistivity of the wire 10. That is, the resistivity of the wire 10 should be previously perceived in order to determine the width of the wire W1. For taking the gauge of resistivity, first a portion of the wire is defined in rectangular form of l1×l2 and then four probes are disposed at four corners of the defined rectangular, resepctively. One pair of probes with l2 interval are connected to a power source and the other pair of probes with l2 interval are connected to a voltmeter. The current I flows from the power source to the defined wire, and then a voltage V between the probes is measured at the voltmeter. Thereafter, the resistivity is calculated using Van der Pauw method. In detail, the resistivity is determined by the following equation.

$$\rho=(V/I)f(l1/l2),$$

where f(l1/l2) is a correction factor, approximate value determined as a function of average probe separation and average specimen diameter.

Since the approximate value is used in calculating the resistivity, a deviation of the resistivity is possibly apt to be large. In particular, where l1 or l2 is not enough larger than the thickness of the wire measured and the size of the probe, the deviation of the resistivity becomes enormously large. Accordingly, such resistivity inevitably results in a debasement in a measuring reliability of the width of the wire.

SUMMARY OF THE INVENTION

Accordingly, an object of the present invention is to accurately measure a width of a wire without using a resistivity of the wire.

In a view of the present invention, a measuring pattern for a width of a wire comprises a first pattern with a first width, a second pattern connected to the first pattern and having a second width wider than the first width and a third pattern connected to the second pattern and having a third width narrower than the first width. The first pattern, the second pattern and the third pattern are made of the same material. The second width is substantially more than ten times the first width and the third width is narrow such that current therethrough is uniform. Also, a joint between the first pattern and the second pattern and a joint between the second pattern and the third pattern have a selected slant angle so as to minimize a current turbulence phenomena. In another view of the present invention, a measuring pattern for the width of the wire is prepared. The measuring pattern includes: a first pattern with a first width; a second pattern connected to the first pattern and having a second width wider than the first width; and a third pattern connected to the second pattern and having a third width narrower than the first width. The first pattern, the second pattern and the third pattern are made of the same material. The first pattern through a power source is connected to the third pattern. A first pair of probes are disposed on the first pattern and then are connected to a first voltmeter. A distance between the first pair of probes is a first distance wider than the first width. A second pair of probes are disposed on the second pattern and then are connected to a second voltmeter. A distance between the second pair of probes is a second distance wider than the first width. Thereafter the first width using gauged voltage at the first voltmeter and the second voltmeter is determined. The first width is determined by the following equation.

$$w=(W*s/S)*(V/v),$$

where w is the first width, W is the second width, s is the first distance, S is the second distance, v is voltage at the first voltmeter and V is voltage at the second voltmeter. The second width is substantially more than ten times the first width and the third width is narrow such that current therethrough is uniform. Also, a joint between the first pattern and the second pattern and a joint between the second pattern and the third pattern have a selected slant angle so as to minimize a current turbulence phenomena. Since evaluated by a distance between a pair of probes which are disposed on the first pattern and the second pattern connected to the first pattern, voltage between the probes and the width of the second pattern, the width of the first pattern is not reflected by whether the sectional view of the tested object is rectangular or not.

Also, unlike the four-probe test method, since the present invention does not compute resistivity of material for the wire, the deviation of the width of the wire owing to the deviation of resistivity is not basically occured.

DESCRIPTION OF THE PRESENT INVENTION

Figure 1:
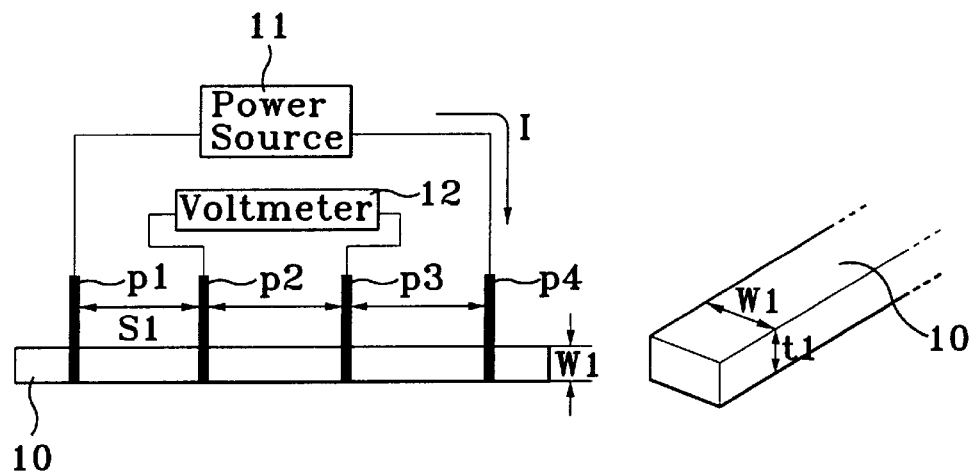
FIG. 1 shows a technique for measuring a width of a wire using the four-probe test.
Figure 2:
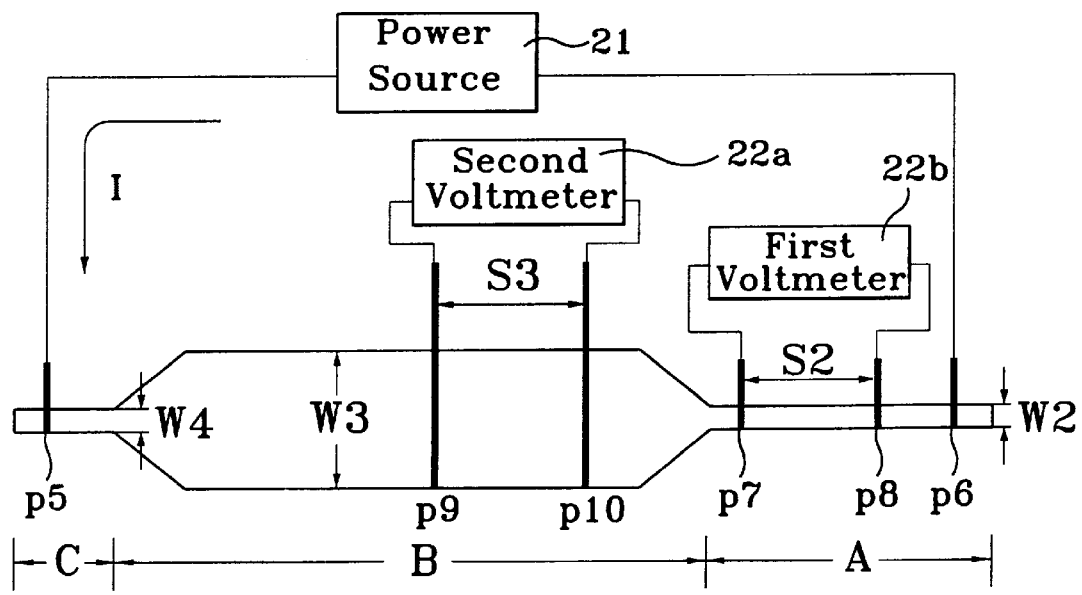
FIG. 2 shows a technique for measuring a width of a wire according to the present invention.

As shown in FIG. 2, a measuring-pattern for a width of a wire has threefold. A wire pattern (first pattern) to be measured is arranged at region A while a auxiliary wire pattern( second pattern and the third pattern) is at a region B and a region C. The first pattern, the second pattern and the third pattern all are made of an identical material and have an identical thickness t. A width W2 (first width) of the first wire pattern is subjected to test, a width W3 (second width) is more than ten times the first width so as to improve the accuracy of the measurement. A width W4 (third width) is designed to be narrow such that current I flowing into the second pattern is uniform. The first pattern is connected to the second pattern and the second pattern is connected to the third pattern. A joint of each pattern has a selected slant such that a turbulence phenomena on current can be minimized.

A method for measuring the first width W2 using such a measuring-pattern of the width of the wire will be described. A first probe p6 and a second probe p5 are disposed on the first pattern and the second pattern, respectively and then are connected to a power source 21. A third probe p7 and a fourth probe p8 are disposed on the first pattern and then are connected to a first voltmeter 22b. The distance S2 between the third probe p7 and the fourth probe p8 is wider than the first width and is preferably more than about ten times the first width. A fifth probe p9 and a sixth probe p10 are disposed on the second pattern and then are connected to a second voltmeter 22a. The distance S3 between the fifth probe p9 and the sixth probe p10 is wider than the first width and is preferably more than about ten times the first width. A distance between the third probe p7 and the sixth probe p10 is preferably short so as to minimize Joule heating loss. The current I supplied to the power source 21 circularly flows from the first pattern to third pattern and voltage V between the third probe and the fourth probe and voltage v between the fifth pattern and the sixth probe are scaled at the first voltmeter 22b and the second voltmeter 22a, respectively. If the loss caused by an internal resistance can be disregard, the current passing through the third pattern, current flowing between the fifth probe and the sixth probe in the second pattern and current flowing between the third probe and the fourth probe in the first pattern, are all substantially the same in magnitude. If the distance between the third probe and the sixth probe is short enough, the resistivity of the first pattern is substantially the same to that of the second pattern.

Therefore, the resistivity $\tilde{N}\pm1$ of the first pattern and the resistivity $\tilde{N}\pm2$ of the second pattern using Ohm's law are represented as following equation (1):

$$\rho1=(W2*t*v)/(S2*I)=\rho2=(W3*t*V)/(S3*I) \quad (1)$$

Then the equation (1) is simplified as following equation (2):

$$W2=(W3*S2/S3)*(V/v) \quad (2)$$

In designing the measuring-pattern of the width of the wire, if the second width W3, the distance S3 between the fifth probe and the sixth probe, the distance S2 between the third probe and the fourth probe are sufficiently large, the deviation possibly generated during the manufacturing process for measuring-pattern of the width of the wire can be neglected. Therefore, (W3*S2/S3) can be treated as constant c, so equation (2) becomes W2=c*(V/v). That is, the first width can be measured by using the gauged voltage at the first voltmeter 22b and the second voltmeter 22a.

As described above, since the first width W2 is dependent only on the third width, the distance between the probes disposed on the first pattern and the second pattern and the measured voltage between the probes thereon, the sectional view of the pattern under the measurement does not reflect the width-measuring of the wire. Also, because unlike the four probe test, the resistivity of the wire is not considered for measuring the width in the present invention, the deviation of the wire-width owing to the deviation of the resistivity is not basically generated.

Further, the thickness t of the wire is not thought of in determining the first width W2, so the degradation of reliability for measuring the width owing to the deviation of the thickness is not fundamentally generated.

While the present invention has been particularly shown and described with reference to particular embodiments thereof, it will be understood by those skilled in the art that various changes in form and details may be effected therein without departing from the spirit and scope of the prevent invention as defined by the appended claims.

What is claimed is:

1. A method for measuring a width of a wire, comprising the steps of:
    preparing a measuring pattern for the width of the wire, said measuring pattern including:
        (a) a first pattern with a first width;
        (b) a second pattern connected to said first pattern and having a second width wider than said first width; and
        (c) a third pattern connected to said second pattern and having a third width wider than said first width; and wherein said first pattern, said second pattern and said third pattern are made of an identical material;
    connecting said first pattern through a power source to said third pattern;
    disposing a first pair of probes on said first pattern and then connecting said first pair of probes to a first voltmeter, a distance between said first pair of probes being a first distance wider than said first width;
    disposing a second pair of probes on said second pattern and then connecting said second pair of probes to a second voltmeter, a distance between said second pair of probes being a second distance wider than said first width; and
    determining said first width using gauged voltage at said first voltmeter and said second voltmeter.

2. The method in claim 1, wherein said first width is determined by the following equation:

$$w=(W*s/S)*(V/v),$$

where w is said first width, W is said second width, s is said first distance, S is said second distance, v is voltage at said first voltmeter and V is voltage at said second voltmeter.

3. The method in claim 2, wherein said second width is substantially more than ten times said first width.

4. The method in claim 2, wherein said third width is narrow such that a current therethrough is uniform.

5. The method in claim 2, wherein a joint between said first pattern and said second pattern and a joint between said second pattern and said third pattern have a selected slant angle so as to minimize a current turbulence phenomena.

6. The method in claim 3, wherein a joint between said first pattern and said second pattern and a joint between said second pattern and said third pattern have a selected slant angle so as to minimize a current turbulence phenomena.

7. The method in claim 4, wherein a joint between said first pattern and said second pattern and a joint between said second pattern and said third pattern have a selected slant angle so as to minimize a current turbulence phenomena.

8. The method in claim 2, wherein said first distance is more than about ten times said first width.

9. The method in claim 2, wherein said second distance is more than about ten times said first width.

10. A method for measuring a width of a wire, comprising the steps of:
   preparing a measuring pattern for the width of the wire, said measuring pattern including:
   (a) a first pattern with a first width;
   (b) a second pattern connected to said first pattern and having a second width more than about ten times said first width; and
   (c) a third pattern connected to said second pattern and having a third width which is narrow such that a current through said third pattern is uniform; and
   wherein said first pattern, said second pattern and said third pattern are made of an identical material;
   connecting said first pattern through a power source to said third pattern;
   disposing a first pair of probes on said first pattern and then connecting said first pair of probes to a first voltmeter, a distance between said first pair of probes being a first distance more than about ten times said first width;
   disposing a second pair of probes on said second pattern and then connecting said second pair of probes to a second voltmeter, a distance between said second pair of probes being a second distance more than about ten times said first width; and
   determining said first width using gauged voltage at said first voltmeter and said second voltmeter.

11. The method in claim 10, wherein said first width is determined by the following equation:

$$w=(W*s/S)*(V/v),$$

where w is said first width, W is said second width, s is said first distance, S is said second distance, v is voltage at said first voltmeter and V is voltage at said second voltmeter.

12. The method in claim 10, wherein a joint between said first pattern and said second pattern and a joint between said second pattern and said third pattern have a selected slant angle so as to minimize a current turbulence phenomena.

* * * * *